US006801764B2

(12) United States Patent
Purpura

(10) Patent No.: US 6,801,764 B2
(45) Date of Patent: Oct. 5, 2004

(54) BROADBAND MEDICAL EMERGENCY RESPONSE SYSTEM

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 09/969,446

(22) Filed: Oct. 2, 2001

(65) Prior Publication Data

US 2003/0064704 A1 Apr. 3, 2003

(51) Int. Cl.[7] .............................................. H04M 11/04
(52) U.S. Cl. ...................... 455/404.1; 455/431; 455/98; 455/521
(58) Field of Search .............................. 455/404.1, 427, 455/431, 521, 98; 128/903; 370/325; 725/75, 76, 77, 84

(56) References Cited

U.S. PATENT DOCUMENTS 6,201,797 B1 * 3/2001 Leuca et al. ................. 370/316

FOREIGN PATENT DOCUMENTS

GB          WO98/40009     *  9/1998  ............ A61B/5/00

OTHER PUBLICATIONS

George Anogianakis, Stavroula Maglavera, and A. Pomportsis, "Relief for Maritime Medical Emergencies through Telematics," Dec. 1998, IEEE Transactions on Information Technology in Biomedicine, vol. 2, No. 4, pp. 254–260.*
Patrick Potega, "Advanced Infrared (AIR): Intra–Cabin Wireless Data Network," 1998, Proceedings of the 17th AIAA/IEEE/SAE Digital Avionics Systems Conference, vol. 2, pp. G15–1—G15–8.*

Electronics and Communications in Japan, Murakami,H., et al, "Medical Data Transmission Using Mobile Satellite Communication", XP–000224953, ISSN 8756–6621, pp. 80–87, Electronics and Communications in Japan, Part 1, vol. 73, No. 10, Oct. 1, 1990.
ICWC, Kotsopoulos S., et al "Communication Protocols and On–Board Processor for a New National Scale Private Mobile Radio Service", XP–002223229, pp. 7.1–7.4, ICWC 1992.
IEE, Losquadro, G., "Aeronautical Satellite Communications for on Multimedia Services", XP–000904605, pp. 7–1—7–7, IEE May 8, 1997.
IEEE, Gomez, EJ, et al, "A Broadband Multimedia Collaborataive System for Advanced Teleradiology and Medical Imaging Diagnosis", XP–000831159, pp. 146–155, IEEE Transactions on Information Technology in Biomedicine, vol. 2, No. 3, Sep. 1998.

* cited by examiner

Primary Examiner—Charles Appiah
Assistant Examiner—James Moore
(74) Attorney, Agent, or Firm—Harness, Dickey & Pierce, P.L.C.

(57) ABSTRACT

A method and apparatus for managing a broadband data communication system onboard a mobile platform during an emergency response situation wherein an onboard emergency response apparatus uses the broadband communication system to transmit and receive broadband communications between the emergency response apparatus and an emergency response center. The broadband communication system has multiple users onboard the mobile platform and allows broadband communication between the multiple onboard users and a ground station. During an emergency response situation, the inbound and outbound data streams between the broadband communication system and the ground station are allocated so that the emergency response apparatus can engage in broadband communication with the emergency response center without being delayed by other users of the broadband communication system while still allowing the other users to use the broadband communication system.

27 Claims, 2 Drawing Sheets

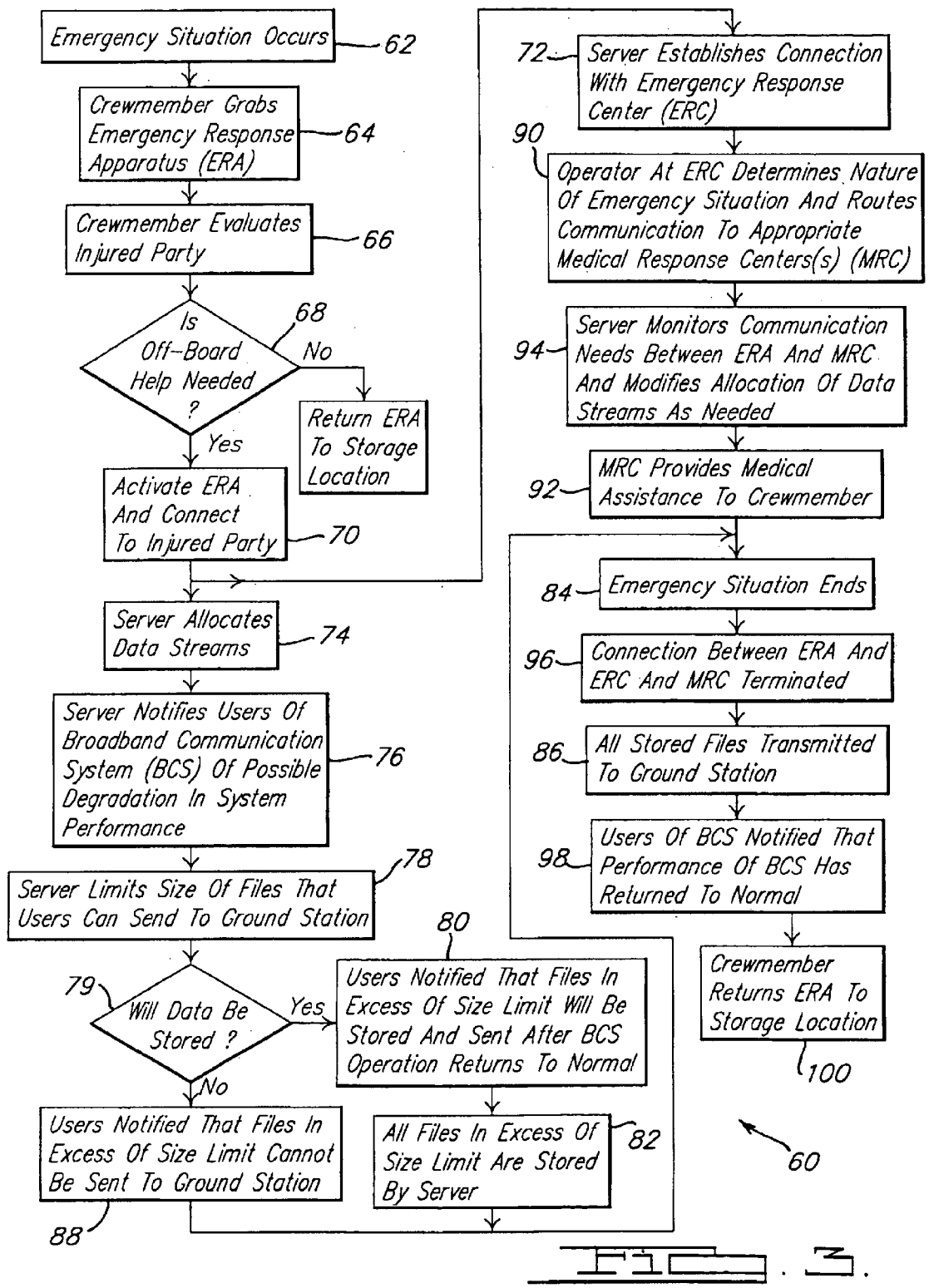

BROADBAND MEDICAL EMERGENCY RESPONSE SYSTEM

FIELD OF THE INVENTION

The present invention relates to broadband communication systems onboard a mobile platform, such as an aircraft, that use satellite communication and, more specifically, to a broadband medical emergency response system that uses the broadband communication system onboard the mobile platform.

BACKGROUND OF THE INVENTION

Currently on mobile platforms, such as aircrafts, ships, and the like, and in remote locations, the availability of competent medical evaluation and diagnosis during a medical emergency is very limited. Additionally, accessing real-time help to aid in the medical emergency is also limited. For example, when an emergency medical situation arises on an aircraft, members of the flight crew on board the aircraft must respond to the medical emergency and offer assistance. While members of the flight crew may have an understanding of basic first aid, the typical member of the flight crew is not trained to provide any assistance beyond basic first aid. As a result, the flight crew will not be able to make a competent decision on whether the medical emergency occurring onboard the aircraft requires immediate attention and the aircraft to divert from its present course and proceed to the nearest airport so that proper medical care can be administered to the injured party. The cost associated with diverting an aircraft from its present course to the closest source of medical care is expensive and a major inconvenience for other passengers on the aircraft. Therefore, it is desirable to know if the medical emergency onboard the aircraft requires the diverting of the aircraft to the nearest source of medical care so that the high cost and inconvenience to other passengers can be avoided if the medical emergency does not require immediate medical attention. Likewise; onboard a ship or at a remote location, the cost of evacuating an injured party to a location where competent medical care can be obtained is also very expensive. At the same time, access to critical medical support in real time may be the only way to save a person under a life threatening medical condition.

Therefore, what is needed is a way to diagnose the medical emergency condition so that an informed decision can be made on whether the medical emergency condition requires immediate transfer of the injured party to a location where medical care can be rendered. Additionally, it is desirable to have access to real-time medical help to aid in the care of the injured party during the transport to the medical care facility. In the event that a medical emergency does not require the immediate transportation of the injured party to a medical care facility, it is desirable to have a means of monitoring the condition of the medical emergency and to provide treatment to the injured party until proper medical care can be administered.

To meet these needs, emergency medical response apparatuses have been developed that allow a person to access real-time medical consulting services. The emergency response apparatuses typically have monitors that can be connected to an injured party to monitor and record various vital signs and conditions of the injured party. The emergency response apparatuses utilize a combination voice and limited data download to aid in diagnosis and to provide a support line to experts in a medical care facility or emergency response center to provide information to a person that is assisting the injured party. On an aircraft, the emergency response apparatus communicates with the emergency response center via air phones located on the aircraft. Due to the nature of the data transmission methodology, data downloads have been limited to the available bandwidth from the airborne; phone systems. When the emergency response apparatus is tied to two sets of phone lines at the same time, the member of the flight crew assisting the injured party has access to full voice support while data is sent on a second line at about 9.6 KB. The member of the flight crew, can choose to send a limited real-time data feed, compressed snapshot telemetry data, or very limited video data from a hand-held camera via this line.

While the use of the emergency response apparatus in conjunction with the air phone system has provided benefits to the flight crew in responding to a medical emergency, the present apparatuses are hindered by the limited data transfer that can be obtained over the air phone lines. Therefore, it would be desirable to be able to take advantage of the increased bandwidth provided by the developing broadband communication systems that are designed for use onboard mobile platforms, so that the amount of data that can be provided from the emergency response-apparatus to the medical providers at an emergency response center can be increased and a better diagnosis of the medical condition can be attained. Additionally, the broadband communication systems will enable real-time video to be transferred between the flight crew and the emergency response center.

The typical broadband communication systems that are deployed and that are being developed to be deployed on mobile platforms are designed to support multiple simultaneous users. Passengers on the mobile platform can access things such as email, web pages, television, and other data sources via the onboard broadband communication systems. The owners of the mobile platforms charge the passengers that utilizes the onboard broadband communication system a fee for using the system. However, the capabilities of the onboard broadband communication systems are not unlimited and the bandwidth can only support so much data being transferred between the mobile platform and a remote location, such a ground station. During an emergency response situation, it is imperative that the emergency response apparatus be given sufficient bandwidth on the onboard broadband communication system, so that proper medical diagnosis and care can be provided. However, it is also desirable to maintain the ability of passengers onboard the mobile platform to continue to use the onboard broadband communication system during the emergency response situation so that the passengers paying for such service can continue to receive the service and the operator of the mobile platform can continue to receive the fees associated with such usage.

Therefore, what is needed is an emergency response apparatus that can use the broadband communication system onboard a mobile platform to engage in broadband communication between the emergency response apparatus and an emergency response center. A method of managing the broadband communication system onboard the mobile platform is also needed so that the emergency response apparatus is provided with the bandwidth necessary for the proper diagnosis and treatment of the emergency medical condition while also allowing passengers onboard the mobile platform to continue or begin to use the broadband communication system onboard the mobile platform. This would allow the operator of a mobile platform to continue to receive revenue from the paying users of the broadband communication system for using the onboard broadband communication system during an emergency response situation.

SUMMARY OF THE INVENTION

The present invention is directed to a method and apparatus for allowing an emergency response apparatus onboard a mobile platform to use a broadband communication system on the mobile platform to engage in broadband communication with an emergency response center during an emergency response situation. The onboard broadband communication system engages in broadband wireless communication with a ground based station. The onboard broadband communication system allows multiple users onboard the mobile platform to simultaneously use the, onboard broadband communication system to communicate with the ground station. A server onboard the mobile platform controls the operation of the onboard broadband communication system. The server allocates data streams between the onboard broadband communication system and the ground station so that the multiple users onboard the mobile platform can simultaneously use the onboard broadband communication system. An emergency response apparatus is located onboard the mobile platform. The emergency, response apparatus is capable of broadband communication with the onboard broadband communication system via the server. The emergency response apparatus is also capable of broadband communication with the ground station via the onboard broadband communication system.

Preferably, the emergency response apparatus is connected to a power supply onboard of the mobile platform when the emergency response apparatus is not being used. The connection of the emergency response apparatus to a power supply when its not being used ensures that the batteries on the emergency response apparatus are being charged when the emergency response apparatus is not being used so that when an emergency situation does arise the emergency response apparatus is fully charged. Also preferably, the emergency response apparatus performs a self diagnostic procedure at predetermined intervals. The diagnostic procedure ensures that the emergency response apparatus is connected to the server and is communicating with the onboard broadband communication system.

In a preferred embodiment, the mobile platform has a wireless local area network (LAN) that is connected to the server. The LAN connects the multiple users and the emergency response apparatus to the server so that the multiple users and the emergency response apparatus can communicate with the onboard broadband communication system.

Preferably, broadband communication between the emergency response apparatus and a ground based emergency response center via the onboard broadband communication system is established when the emergency response apparatus is activated. The server allocates data streams between the onboard broadband communication system and the ground station when the emergency response apparatus is activated. The allocation of the data streams allows the emergency response apparatus to engage in broadband communication with the emergency response center without being delayed by other users of the onboard broadband communication system while still allowing the other users to use the onboard broadband communication system to communicate with the ground station. Preferably, the emergency response apparatus and the emergency response center engage in simultaneous two-way real-time audio, video and data broadband communication. When the data streams are being allocated by the server, it is preferred that the server notifies each user of the onboard broadband communication system that a degradation in performance of the onboard broadband communication system may be experienced.

In a preferred embodiment, the server prevents files in excess of a predetermined size from being sent by users of the onboard broadband communication system to the ground station while the server is allocating the data streams. Even more preferably, the server stores the files that exceed the predetermined size while the server is allocating the data streams. Once the server ceases allocating the data streams, the server sends the stored files to the ground station so that no data is lost. Preferably, the server notifies the other users of the onboard broadband communication system that the performance of the onboard broadband communication system has returned to normal after the server ceases allocating the data streams.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a simplified flowchart of the management of the broadband communication system onboard the mobile platform of FIG. 2 during an emergency response situation.

DETAILED DESCRIPTION OF THE PREFERRED EMBODIMENTS

The following description of the preferred embodiment(s) is merely exemplary in nature and is in no way intended to limit the invention, its application, or uses.

Figure 1:
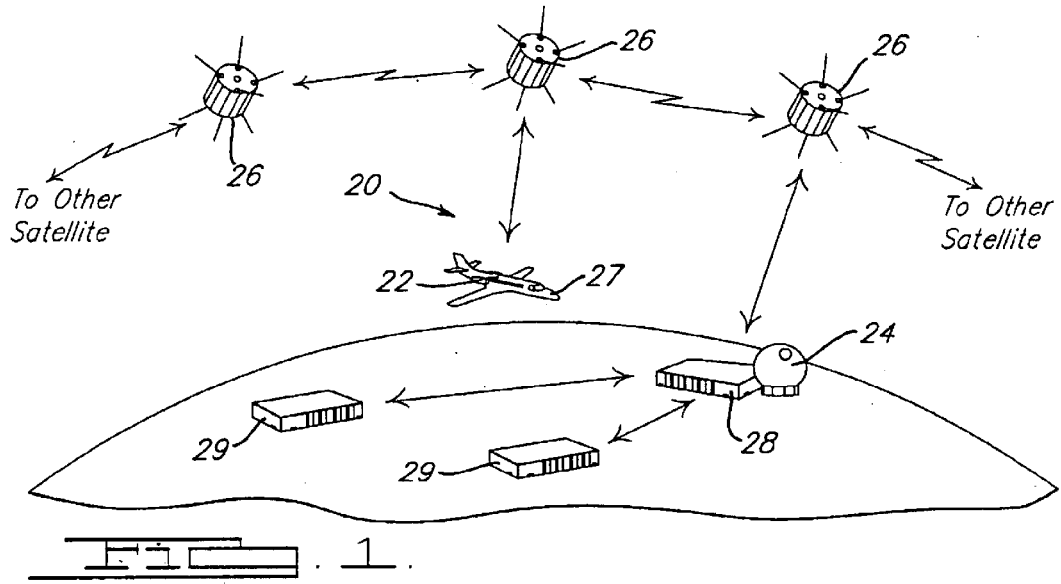
FIG. 1 is a simplified drawing illustrating the broadband communication between a mobile platform and a ground station.

Referring to Fig. 1, there is shown a typical broadband communication path 20 between a mobile platform 22 and a ground station 24. One or more satellites 26 are part of the communication path 20. The mobile platform 22 sends broadband communication to one or more of the satellites 26 which relay the broadband communication to the ground station 24. Alternatively, the satellite 26 may relay the broadband communication to additional satellites 26, as needed, and then to the ground station 24, as is known in the art. The ground station 24 sends broadband communications to the mobile platform 22 via one or more satellite(s) 26 which relay the broadband communication to the mobile platform 22. The communication path 20 thereby provides bidirectional broadband communication between the mobile platform 22 and the ground station 24 by way of one or more satellites 26.

The ground station 24 is capable of bidirectional broadband communication with an emergency response center 28. The emergency response center 28 can be part of the ground station 24 or can be in a facility separate from the ground station 24. Typically, the ground station 24 engages in bidirectional broadband communication with the emergency response center 28 via standard broadband terrestrial links, as is known in the art. The emergency response center 28 is capable of bi-directional broadband communication with one or more medical facilities 29. The emergency response center 28 engages in bidirectional broadband communication with one or more medical facilities 29 via standard broadband terrestrial ground links, as is known in the art. The communication path 20 thereby enables the mobile platform 22 to communicate with the emergency response center 28 and one or more medical facilities 29 via the above-described bi-directional broadband communication capabilities.

While the communication path 20 has been discussed as allowing the mobile platform 22 to communicate with a single ground station 24, it should be understood that the above description is for a typical communication path 20 and that the mobile platform 22 can communicate with multiple ground stations 24 via the satellite(s) 26, as is known in the art, and still be within the scope of the invention. Therefore, the above description of the communication path 20 should not be considered as limiting the scope of the invention.

The mobile platform 22 could comprise aircraft, cruise ships or any other moving vehicle. Thus, the illustration of the moving platform 22 as an aircraft 27 in the figures herein, and the reference to the mobile platform 22 as an aircraft 27 throughout the following description should not be construed as limiting the applicability of the invention to only aircraft.

Figure 2:
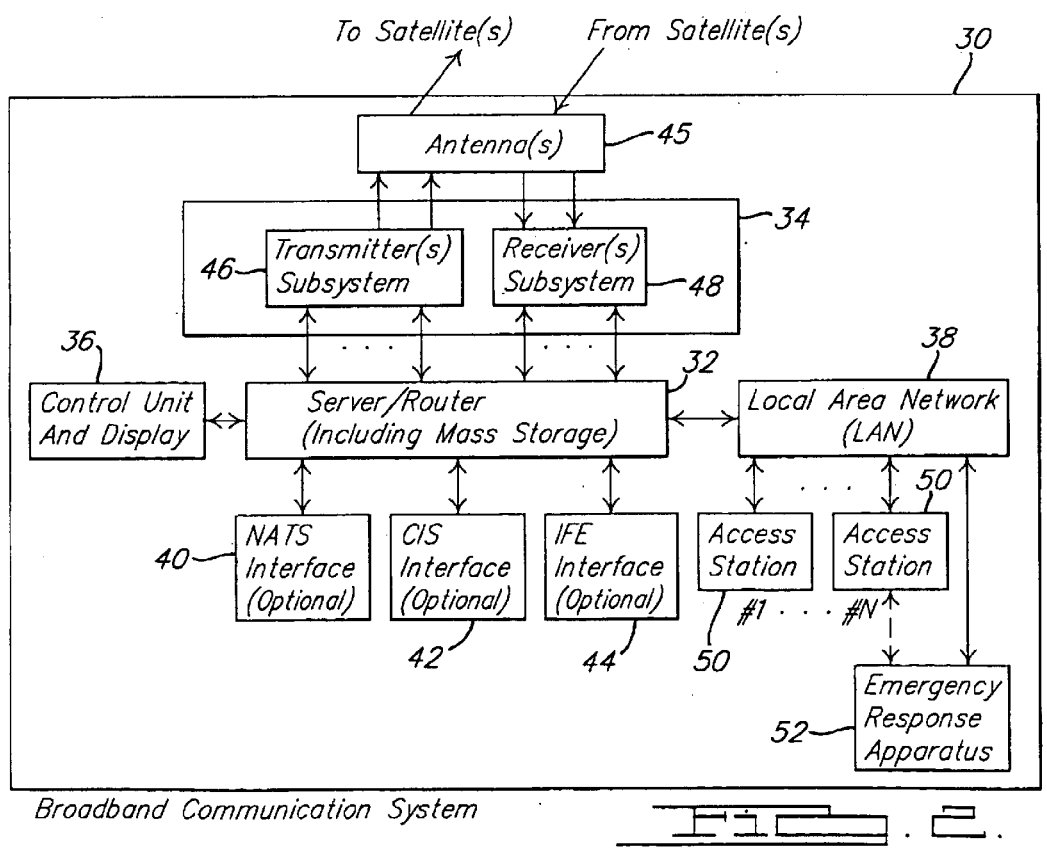
FIG. 2 is a simplified block diagram drawing illustrating the major components of a typical broadband communication system onboard a mobile platform.

Referring to FIG. 2, there is shown a simplified overview of a typical broadband communication system 30 onboard a mobile platform 22. The broadband communication system 30 includes a data content management system in the form of a router/server 32 (hereinafter "server") which is in communication with a communications subsystem 34, a control unit and display system 36, and a distribution system in the form of a local area network (LAN) 38. Optionally, the server 32 can also be configured for operation in connection with a National Air Telephone System (NATS) 40, a crew information services system (CIS) 42 and/or an in-flight entertainment system (IFE) 44. The communication subsystem 34 is connected to an antenna subsystem 45.

The server 32 manages the data being sent throughout the broadband communication system 30 and can allocate the bandwidth of the broadband communication system 30 to the various functions of the broadband communication system 30 in several ways. For example, the server 32 can set a data transfer limit on each data stream to the various functions so that the data streams are allocated a specific percentage of the available bandwidth. The server 32 can also move all data streams of a given type to just one or more specific input/output channels. The server 32 can then dedicate the needs of a specific function (such as an emergency response function) to an unshared input/output channel. These allocations can be made by a combination of server operating system settings as well as by specific data server directions to key server hardware components such as SCSI and ethernet interfaces. While the above description and subsequent descriptions of the server 32 allocating the bandwidth of the broadband communication system 30 are described with reference to specific ways of allocating the bandwidth, it should be understood that the descriptions are for exemplary purposes only and that other methods of allocating the bandwidth by the server 32 are possible, as is known in the art, and that such other methods of allocating the bandwidth are within the scope of the invention as defined by the claims.

The communication subsystem 34 includes a transmitter subsystem(s) 46 and a receiver subsystem(s) 48 that are connected to the antenna subsystem 45. Typically, the antenna subsystem 45 includes separate transmit and receive antennas (not shown) that are connected, respectively, to the transmitter subsystem 46 and the receiver subsystem 48. The, transmitter subsystem 46 includes an encoder (not shown), a modulator (not shown) and an up-converter (not shown) for encoding modulating and up-converting data content signals from the server 32 to the transmit antenna. The receiver subsystem 48 includes a decoder (not shown), a demodulator (not shown) and a down-converter (not shown) for decoding, demodulating and down-converting data content signals received by the receive antenna. While only one receiver subsystem 48 is shown, it will be appreciated that a plurality of receiver subsystems 48 will typically be included to enable simultaneous reception of a plurality of signals from the satellite(s) 26.

The signals received by the receiver subsystem 48 are input to the server 32. The LAN 38 is used to interface the server 32 to a plurality of access stations 50. The access stations 50 are typically associated with locations on the mobile platform 22 wherein passengers on the mobile platform 22 can use the access stations 50 to send and receive broadband communications. For example, on an aircraft 27 the access stations 50 may be associated with each seat location onboard the aircraft 27. Each access station 50 can be used to interface the server 32 directly with a user's laptop computer, personal digital assistant (PDA), or other personal computing device of the user. The access stations 50 could also each comprise a seatback mounted computer/display. The LAN 38 enables bidirectional broadband communication of data between the user's computing device and the server 32 such that each user is able to request a desired broadband communication such as a channel of television programming, accessing a desired website, accessing his/her email, or performing a wide variety of other tasks independently of other users onboard the mobile platform 22.

An emergency response apparatus 52 connects to the server 32 via the LAN 38. The emergency response apparatus 52 can connect to the LAN 38 via any of the access stations 50 so that the emergency response apparatus 52 can engage in broadband communication with the emergency response center 28 via the broadband communication system 30 onboard the mobile platform 22. Preferably, the LAN 38 is a wireless LAN 38 so that the emergency response apparatus 52 does not need to be physically connected to an access station 50 to engage in broadband communication with an emergency response center 28 via the broadband communication system 30 onboard the mobile platform 22. The use of a wireless LAN 38 also enables the emergency response apparatus 52 to be used in any location on the mobile platform 22 regardless of the locations of the access stations 50. Additionally, the wireless LAN 38 allows the access stations 50 to be located throughout the mobile platform 22 without the need for connecting the access stations. 50 to the LAN 38 with hard connections, such as wires, cables and the like, as is known in the art.

The emergency response apparatus 52 provides real-time medical consulting access via the broadband communication system 30 onboard the mobile platform 22. It is the broadband communication system 30 onboard the mobile platform 22 that enables the emergency response apparatus 52 to engage in bidirectional broadband communication with an emergency response center 28. The emergency response apparatus 52 is a remote monitoring device that measures and monitors various parameters of an injured party. For example, the typical emergency response apparatus 52 has capabilities that include, but are not limited to the following: (1) an integrated hands-free voice link that enables a user of the emergency response apparatus 52 to have constant hands-free contact with the emergency response center 28; (2) an electrocardiogram apron that can be attached to the injured party and provide full cardiac details that are essential to identify serious heart complaints; (3) a capnometer which measures the respiration rate and exhaled $CO_2$; (4) a pulse oximeter that measures blood oxygen levels and pulse rate; (5) a blood pressure monitor; (6) a temperature probe such as an infrared ear thermometer; (7) a wrist keypad that controls the operation of the emergency response apparatus 52 and keeps both hands free thereby simplifying the operation of the emergency response apparatus 52, particularly in confined spaces; and (8) a still video camera that helps prevent any confusion between a doctor in a medical facility 29 and the user of the emergency response apparatus 52. This type of emergency response apparatus 52 is known in the art. For example, the Tempus 2000 system sold by RTD LTD of Hampshire, United Kingdom performs such functions. However, the Tempus 2000 uses existing airborne phone systems on mobile platforms 22 which greatly limit the data that can be bi-directionally communicated between the emergency response apparatus 52 and the emergency response center 28.

Preferably, the emergency response apparatus 52 is stored on the mobile platform 22 so that the emergency response apparatus 52 is connected to a power supply when the emergency response apparatus 52 is not being used. The connection of the emergency response apparatus 52 to a power supply when it is not in use enables the batteries (not shown) on the emergency response apparatus 52 to be fully charged when an emergency situation arises and the use of the emergency response apparatus 52 is required.

It is also preferred that the emergency response apparatus 52 perform a self-diagnostic procedure at a predetermined interval to ensure that the emergency response apparatus 52 is connected to the server 32 via the wireless LAN 38 so that when an emergency situation arises the emergency response apparatus 52 can be used to respond to the emergency response situation. The predetermined interval at which the self-diagnostic procedure is performed is determined by the owner of the mobile platform 22. For example, the self-diagnostic procedure can occur at one-minute intervals, 30-second intervals, 10-second intervals, etc. The desired interval for conducting the self-diagnostic procedure can be programmed into the emergency response apparatus 52.

The broadband communication system 30 onboard the mobile platform 22 enables the emergency response apparatus 52 to engage in broadband communication with an emergency response center 28. The broadband communication system 30 onboard the mobile platform 22 greatly expands upon the data flow capacity of an emergency response apparatus 52 using an air telephone system. For example, it is anticipated that the broadband communication system 30 onboard the mobile platform 22 can enable the capability of 1 MB data flow from the ground station 24 and/or the emergency response center 28 to the mobile platform 22 as well as 196K from the mobile platform 22 to the ground station 24 and/or the emergency response center 28. The expanded bandwidth capability of the broadband communication system 30 onboard the mobile platform 22 allows the services provided by the emergency response apparatus 52 to be greatly enhanced over the existing services that are available via the air telephone lines. Some enhancements include: (1) true concurrent real-time audio and video feeds, both on and off the mobile platform as opposed to the current crude and truncated time-slice video that is possible today; (2) simultaneous real-time medical telemetry data feeds to the ground station 24 and/or the emergency response station 28 for all data types, not just those chosen to be sent one at a time by a user of the emergency response apparatus 52; (3) wireless operation within the aircraft cabin by the emergency response apparatus 52 which eliminates the need to have hard connection points located throughout the mobile platform 22 for the emergency response apparatus 52 to connect to the server 32; (4) the ability to design the diagnostic system so that the emergency response apparatus 52 is always in an active, stand-by, mode that eliminates the several minutes of delay typically required in starting up most PC-based emergency response apparatus 52; and (5) instant, via user-friendly touch-pad screen map buttons, connection to multiple medical response centers based around the world which are able to further route and/or bring onboard appropriate medical facilities .29 depending on the language and expertise required.

Referring now to FIG. 3, a general flowchart 60 of the management of the broadband communication system 30 onboard the mobile platform 22 during an emergency situation wherein the emergency response apparatus 52 is utilized, is shown. When a medical emergency is detected, as indicated in step 62, onboard the mobile platform 22, a crew member is notified. The crew member, in responding to the medical emergency, takes the emergency response apparatus 52, as indicated in step 64, from its stored location where it has been under constant battery charge as well as performing regular self-diagnostic procedures, as was discussed above. The crew member takes the emergency response apparatus 52 to the injured party's location and determines if off-board medical help will be required to respond to the emergency situation, as indicated in steps 66 and 68. If it is determined that off-board help is needed, the crew member activates the emergency response apparatus 52 and connects the emergency response apparatus 52 to the injured party, as indicated in step 70. In the event that the LAN 38 is not a wireless LAN 38, the crew member will connect the emergency response apparatus 52 to an access station 50 prior to activation so that the emergency response apparatus 52 can use the broadband communication system 30 to engage in bi-directional broadband communication with the emergency response center 28.

The activation of the emergency response apparatus 52 performs the equivalent of a "911" call to the broadband communication system 30 onboard the mobile platform 22 as well as to the emergency response center 28 via the broadband communication system 30 onboard the mobile platform 22, as indicated in step 72. Upon receiving the "911" call from the emergency response apparatus 52, the server 32 adjusts its operating mode in response to the emergency situation. The server 32 allocates both inbound and outbound data streams between the broadband communication system 30 onboard the mobile platform 22 and the ground station 24 when the emergency response apparatus 52 is activated, as indicated in step 74. The allocation of the inbound and outbound data streams allows the emergency response apparatus 52 to engage in bidirectional broadband communication with the emergency response center 28 without being delayed by other users of the broadband communication system 30 onboard the mobile platform 22. The allocating of the inbound and outbound data streams still allows other users onboard the mobile platform 22 to continue to use the broadband communication system 30 onboard the mobile platform 22. Preferably, the allocating of the inbound and outbound data streams allows the emergency response apparatus 52 to engage in simultaneous bidirectional real-time audio, video and data broadband communication with the emergency response center 28 while still allowing the other users to continue to use the broadband communication system 30, albeit with a possible degradation in performance due to the allocating of the data streams.

The amount of allocating of the inbound and outbound data streams can vary depending upon the capabilities of the broadband communication system 30 onboard the mobile platform 22 and the needs of the emergency response apparatus 52. For example, the broadband communication system 30 may have an inbound data stream of 1 MB while the outbound data stream is limited to 196K. In this situation, the allocation of the inbound data stream may be such that 25% of the inbound data stream is allocated to only be used to provide broadband, communication between the emergency response center 28 and the emergency response apparatus 52 while the remaining 75% can be used to provide data content to: other users of the broadband communication system 30. Likewise, the outbound data stream may be allocated so that 75% of the outbound data stream is allocated to only be used for broadband communication between the emergency response apparatus 52 and the emergency response center 28 while the remaining 25% can be used by the other users of the broadband communication system 30. Additionally, the server 32 can monitor the size of the data streams being sent between the emergency response apparatus 52 and the emergency response center 28 and adjust the allocations of the data streams as needed to ensure that no delay is occurring in the communication between the emergency response apparatus 52 and the emergency, response center 28 due to the use of the broadband communication system 30 by other users.

While the allocation of the inbound and outbound data streams have been shown by example to be specific allocations, it should be understood that the allocating of the data streams can vary based upon the needs of the emergency response situation and, as such, the invention is not limited to the specific percentage allocations discussed herein. Additionally, the specific capabilities of the broadband communication system 30 were shown and discussed for exemplary purposes and are not to be viewed as limiting the scope of the invention as defined by the claims.

When the server 32 allocates the data streams, it is preferred that the server 32 notifies the onboard users of the broadband communication system 30 onboard the mobile platform 22 that a degradation in the performance of the broadband communication system 30 may be experienced due to an emergency response situation, as indicated in step 76. The notification to the users of the broadband communication system 30 onboard the mobile platform 22 can be via instant messaging, as is known in the art. However, other methods of notifying the users can be employed without departing from the scope of the invention. The notice may also inform the other users that all outbound communication via the broadband communication system 30 onboard the mobile platform 22 will be operated under size limits until the emergency situation is completed. Preferably, as shown in step 78, the server 32 prevents files that exceed a predetermined size from being sent by onboard users of the broadband communication system 30 to the ground station 24 while the data streams are being allocated. For example, the predetermined size limitation could be 64K and the server 32 would prevent files exceeding 64K from being sent by users of the broadband communication system 30. The predetermined limitation on the size of outbound files that can be sent via the broadband communication system 30 to the ground station 24 is dependent upon the outbound data capacity of the broadband communication system 30, the number of users of the broadband communication system 30 and the needs of the emergency response apparatus 52 in communicating with the emergency response center 28. Therefore, the predetermined limitation on the size of file that can be sent from the mobile platform 22 via the broadband communication system 30 during an emergency response situation can vary.

Preferably, as shown in decision step 79, files that exceed the predetermined size limitation that are desired to be sent by a user of the broadband communication system 30 to the ground station 24 are stored or cached by the server 32 during the emergency response situation, as indicated in steps 80 and 82. When the emergency response situation has ended, as indicated in step 84, and the data streams are no longer being allocated, the server 32 can then transmit the stored files to the ground station 24 via the broadband communication system 30, as indicated in step 86. A notification is then sent to the user(s) whose file(s) were stored that the file(s) have been successfully transferred.

Alternatively, as shown in decision step 79, the files that exceed the predetermined size limitation that are intended to be sent by a user onboard the mobile platform 22 to the ground station 24 via the broadband communication system 30 can be prevented from being transferred and not be stored for later transmission to the ground station 24 after the emergency response situation has ended. In this situation, it is preferred that the server 32 notify the user attempting to send the file exceeding the predetermined limit that the file cannot be sent at this time due to the emergency response situation, as indicated in step 88. This alternative eliminates the need to store and later transmit the files exceeding the predetermined size limit.

When broadband communication between the emergency response apparatus 52 and the emergency response center 28 is established, an operator in the emergency response center 28 will verbally review the emergency situation with the crew member responding to the emergency situation, as indicated in step 90. After assessing the nature and severity of the emergency situation, the operator at the emergency response center will route the broadband communication from the emergency response apparatus 52 to an appropriate medical facility 29 and medical assistance is provided, as indicated in step 92. The broadband communication from the emergency response apparatus 52 may be routed to a plurality of medical facilities 29 depending upon the needs of the emergency situation. The emergency response center 28 may serve as a focal point to monitor and connect the emergency response apparatus 52 to the medical facility 29 and to route the broadband communication to additional medical facilities 29 as needed. Alternatively, the emergency response center 28 can route the broadband communication from the emergency response apparatus 52 to the medical facility 29 and then take a non-active role in the broadband communication occurring therebetween. The routing of the broadband communication from the emergency response center 28 to one or more medical facilities 29 is performed via standard broadband terrestrial links, as is known in the art. It is anticipated that the capacities of the standard terrestrial broadband links will exceed the capabilities of the broadband communication system 30 and that the broadband communication system 30 capabilities will be the limiting factor in the broadband communication between the emergency response apparatus 52 and the medical facilities 29. Preferably, as shown in step 94, once the emergency response apparatus 52 is engaging in bidirectional broadband communication with the emergency response center 28 and/or with one or more medical facilities 29, the server 32 monitors and adjusts the inbound and outbound data streams to support the needs of the emergency response apparatus 52 and prevent other users of the broadband communication system 30 from delaying communication between the emergency response apparatus 52 and the emergency response center 28.

Once the emergency situation is over, as indicated in step 84, the crew member will terminate the broadband communication between the emergency response apparatus 52 and the emergency response center 28, as indicated in step 96. When the broadband communication is terminated, the server 32 will cease to allocate the inbound and outbound data streams between the broadband communication system 30 and the ground station 24. The operation of the broadband communication system 30 can then return to its normal or pre-emergency situation operating condition. Preferably, when the server 32 ceases to allocate the inbound and outbound data streams, the server 32 notifies the users of the broadband communication system 30 that the emergency situation has ended and the performance of the broadband communication system 30 is returning to normal, as indicated in step 98. The crew member will return the emergency response apparatus 52 to its storage location wherein the batteries can be recharged, as indicated in step 100.

The above-described management of the broadband communication system 30 onboard a mobile platform 22 during an emergency response situation thereby enables: (1) the emergency response apparatus 52 to engage in bidirectional broadband communication with an emergency response center 28 without being delayed by other onboard users of the broadband communication system 30 on the mobile platform 22; and (2) allows onboard users of the broadband communication system 30 on the mobile platform 22 to continue to use the broadband communication system 30 during an emergency response situation.

The description of the invention is merely exemplary in nature and, thus, variations that do not depart from the gist of the invention are intended to be within the scope of the invention. Such variations are not to be regarded as a departure from the spirit and scope of the invention.

Those skilled in the art can now appreciate from the foregoing description that the broad teachings of the present invention and method can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A method of managing a broadband data communication system onboard a mobile platform during an emergency response situation wherein an onboard emergency response apparatus uses said broadband communication system onboard said mobile platform to transmit and receive broadband communications between said emergency response apparatus and an emergency response center and wherein said onboard broadband communication system has multiple onboard users and allows broadband communication between said multiple onboard users and a ground station, the method comprising the steps of:

activating said emergency response apparatus;

allocating inbound and outbound data streams between said onboard broadband communication system and said ground station when said emergency response apparatus is activated, said allocating occurring at least when a delay in broadband communication by said emergency response apparatus would result due to other users using said onboard broadband communication system so that said emergency response apparatus can engage in broadband communication with said emergency response center without being delayed by said other users of said onboard broadband communication system while still allowing said other users to use said onboard broadband communication system; and establishing broadband communication between said emergency response apparatus and said emergency response center via said onboard broadband communication system so that said emergency response apparatus can engage in broadband communication with said emergency response center.

2. The method of claim 1, wherein the step of allocating inbound and outbound data streams further comprises:

allocating said inbound and said outbound data streams so that said emergency response apparatus and said emergency response center can engage in simultaneous two-way real time audio, video, and data broadband communication.

3. The method of claim 1, further comprising the step of: terminating said broadband communication between said onboard emergency response apparatus and said emergency response center after said emergency response apparatus has been deactivated.

4. The method of claim 3, further comprising the step of: ceasing to allocate said inbound and said outbound data streams after terminating said broadband communication between said onboard emergency response apparatus and said emergency response center so that said onboard broadband communication system operates in the same manner as before said emergency response situation.

5. The method of claim 1, wherein said mobile platform has an onboard wireless local area network and the step of establishing broadband communication between said emergency response apparatus and said emergency response center via said onboard broadband communication system further comprises:

using said onboard wireless local area network to transmit and receive broadband communications between said emergency response apparatus and said onboard broadband communication system.

6. The method of claim 1, wherein said step of allocating said inbound and outbound data streams includes providing sufficient bandwidth from an available bandwidth to said emergency response apparatus to engage in broadband communication with said emergency response center without being delayed by said other users of said onboard broadband communication system and providing a portion of said available bandwidth to said other users to allow continued use of said onboard broadband communication system by said other users.

7. The method of claim 1, wherein said step of allocating said inbound and outbound data streams includes assigning a percentage of an available bandwidth to said emergency response apparatus.

8. The method of claim 1, wherein said step of allocating said inbound and outbound data streams includes assigning inbound and outbound data streams from said emergency response apparatus and said other users to specific input and output channels of said onboard broadband communication system.

9. A method of managing a broadband data communication system onboard a mobile platform during an emergency response situation wherein an onboard emergency response apparatus uses said broadband communication system onboard said mobile platform to transmit and receive broadband communications between said emergency response apparatus and an emergency response center and wherein said onboard broadband communication system has multiple onboard users and allows broadband communication between said multiple onboard users and a ground station, the method comprising the steps of:

activating said emergency response apparatus;

allocating inbound and outbound data streams between said onboard broadband communication system and said ground station when said emergency response apparatus is activated so that said emergency response apparatus can engage in broadband communication with said emergency response center without being delayed by other users of said onboard broadband communication system while still allowing said other users to use said onboard broadband communication system;

establishing broadband communication between said emergency response apparatus and said emergency response center via said onboard broadband communication system so that said emergency response apparatus can engage in broadband communication with said emergency response center; and notifying said other users of said onboard broadband communication system that a degradation in performance of said onboard broadband communication system may be experienced when said inbound and said outbound data streams are being allocated.

10. A method of managing a broadband data communication system onboard a mobile platform during an emergency response situation wherein an onboard emergency response apparatus uses said broadband communication system onboard said mobile platform to transmit and receive broadband communications between said emergency response apparatus and an emergency response center and wherein said onboard broadband communication system has multiple onboard users and allows broadband communication between said multiple onboard users and a ground station, the method comprising the steps of:

activating said emergency response apparatus;

allocating inbound and outbound data streams between said onboard broadband communication system and said ground station when said emergency response apparatus is activated so that said emergency response apparatus can engage in broadband communication with said emergency response center without being delayed by other users of said onboard broadband communication system while still allowing said other users to use said onboard broadband communication system;

establishing broadband communication between said emergency response apparatus and said emergency response center via said onboard broadband communication system so that said emergency response apparatus can engage in broadband communication with said emergency response center; and preventing files that exceed a predetermined size from being sent by said other users of said onboard broadband communication system to said ground station while said inbound and said outbound data streams are being allocated.

11. The method of claim 10, further comprising the step of:

storing said files that exceed said predetermined size that are trying to be sent by said other users of said onboard broadband communication systems to said ground station while said inbound and said outbound data streams are being allocated.

12. The method of claim 11, further comprising the step of:

transmitting said stored files to said ground station after said allocation of said inbound and said outbound data streams has ceased.

13. A method of managing a broadband data communication system onboard a mobile platform during an emergency response situation wherein an onboard emergency response apparatus uses said broadband communication system onboard said mobile platform to transmit and receive broadband communications between said emergency response apparatus and an emergency response center and wherein said onboard broadband communication system has multiple onboard users and allows broadband communication between said multiple onboard users and a ground station, the method comprising the steps of:

activating said emergency response apparatus;

allocating inbound and outbound data streams between said onboard broadband communication system and said ground station when said emergency response apparatus is activated so that said emergency response apparatus can engage in broadband communication with said emergency response center without being delayed by other users of said onboard broadband communication system while still allowing said other users to use said onboard broadband communication system;

establishing broadband communication between said emergency response apparatus and said emergency response center via said onboard broadband communication system so that said emergency response apparatus can engage in broadband communication with said emergency response center; and notifying said other users of said onboard broadband communication system that performance of said onboard broadband communication system has been returned to normal after ceasing to allocate said inbound and said outbound data streams.

14. A broadband emergency response system for use on a mobile platform having an onboard broadband communication system that engages in broadband wireless communication with a ground based station, the broadband emergency response system comprising:

a server onboard said mobile platform that controls the operation of said onboard broadband communication system and allocates inbound and outbound data streams between said onboard broadband communication system and said ground based station so that multiple users onboard said mobile platform can simultaneously use said onboard broadband communication system; and an emergency response apparatus located onboard of said mobile platform, said emergency response apparatus being capable of broadband communication with said onboard broadband communication system via said server and of broadband communication with said ground based station via said onboard broadband communication system, wherein said server allocates inbound and outbound data streams between said onboard broadband communication system and said ground station at least when said emergency response apparatus requests broadband communication with said emergency response center and a delay would result in said broadband communication between said emergency response apparatus and said emergency response center due to other users using said onboard broadband communication system so that said emergency response apparatus can engage in broadband communication with said emergency response center without being delayed by said other users of said onboard broadband communication system while still allowing said other users to use said onboard broadband communication system to communicate with said ground station.

15. The broadband emergency response system of claim 14, wherein:

said emergency response apparatus is connected to a power supply onboard of said mobile platform when said emergency response apparatus is not being used so that batteries on said emergency response apparatus are being charged when said emergency response apparatus is not being used.

16. The broadband emergency response system of claim 14, wherein:

a wireless local area network is connected to said server and connects said multiple users and said emergency response apparatus to said server so that said multiple users and said emergency response apparatus can communicate with said onboard broadband communication system.

17. The broadband emergency response system of claim 16, wherein:

broadband communication with a ground based emergency response center via said onboard broadband communication system is established when requested by said emergency response apparatus.

18. The broadband emergency response system of claim 14, wherein:

said emergency response apparatus and said emergency response center engage in simultaneous two-way real time audio, video, and data broadband communication.

19. The broadband emergency system of claim 14, wherein said server provides sufficient bandwidth from an available bandwidth to said emergency response apparatus to engage in broadband communication with said emergency response center without being delayed by said other users of said onboard broadband communication system and provides a portion of said available bandwidth to said other users to allow continued use of said onboard broadband communication system by said other users.

20. The broadband emergency system of claim 14, wherein said server assigns a percentage of an available bandwidth to said emergency response apparatus.

21. The broadband emergency system of claim 14, wherein said server assigns inbound and outbound data streams from said emergency response apparatus and said other users to specific input and output channels of said onboard broadband communication system.

22. A broadband emergency response system for use on a mobile platform having an onboard broadband communication system that engages in broadband wireless communication with a ground based station, the broadband emergency response system comprising:

a server onboard said mobile platform that controls the operation of said onboard broadband communication system and allocates inbound and outbound data streams between said onboard broadband communication system and said ground based station so that multiple users onboard said mobile platform can simultaneously use said onboard broadband communication system; and an emergency response apparatus located onboard of said mobile platform, said emergency response apparatus being capable of broadband communication with said onboard broadband communication system via said server and of broadband communication with said ground based station via said onboard broadband communication system, wherein said emergency response apparatus performs a self diagnostic procedure at predetermined intervals to ensure that said emergency response apparatus is connected to said server and is communicating with said onboard broadband communication system.

23. A broadband emergency response system for use on a mobile platform having an onboard broadband communication system that engages in broadband wireless communication with a ground based station, the broadband emergency response system comprising:

a server onboard said mobile platform that controls the operation of said onboard broadband communication system and allocates inbound and outbound data streams between said onboard broadband communication system and said ground based station so that multiple users onboard said mobile platform can simultaneously use said onboard broadband communication system; and an emergency response apparatus located onboard of said mobile platform, said emergency response apparatus being capable of broadband communication with said onboard broadband communication system via said server and of broadband communication with said ground based station via said onboard broadband communication system, wherein said server allocates inbound and outbound data streams between said onboard broadband communication system and said ground station when said emergency response apparatus requests broadband communication with said emergency response center so that said emergency response apparatus can engage in broadband communication with said emergency response center without being delayed by other users of said onboard broadband communication system while still allowing said other users to use said onboard broadband communication system to communicate with said ground station, wherein said server notifies each user of said other users of said onboard broadband communication system that a degradation in performance of said onboard broadband communication system may be experienced when said server allocates said inbound and outbound data streams.

24. A broadband emergency response system for use on a mobile platform having an onboard broadband communication system that engages in broadband wireless communication with a ground based station, the broadband emergency response system comprising:

a server onboard said mobile platform that controls the operation of said onboard broadband communication system and allocates inbound and outbound data streams between said onboard broadband communication system and said ground based station so that multiple users onboard said mobile platform can simultaneously use said onboard broadband communication system; and an emergency response apparatus located onboard of said mobile platform, said emergency response apparatus being capable of broadband communication with said onboard broadband communication system via said server and of broadband communication with said ground based station via said onboard broadband communication system, wherein said server allocates inbound and outbound data streams between said onboard broadband communication system and said ground station when said emergency response apparatus requests broadband communication with said emergency response center so that said emergency response apparatus can engage in broadband communication with said emergency response center without being delayed by other users of said onboard broadband communication system while still allowing said other users to use said onboard broadband communication system to communicate with said ground station, wherein said server prevents files in excess of a predetermined size from being sent by users of said onboard broadband communication system to said ground station while said server is allocating said inbound and outbound data streams.

25. The broadband emergency response system of claim 24, wherein:

said server stores said files that exceed said predetermined size while said server is allocating said inbound and outbound data streams; and said server sends said files to said ground station after said server ceases allocating said inbound and outbound data streams.

26. A method of managing a broadband data communication system onboard a mobile platform during an emergency response situation wherein an onboard emergency response apparatus uses said broadband communication system onboard said mobile platform to transmit and receive broadband communications between said emergency response apparatus and an emergency response center and wherein said onboard broadband communication system has multiple onboard users and allows broadband communication between said multiple onboard users and a ground station, the method comprising the steps of:

activating said emergency response apparatus;

allocating inbound and outbound data streams between said onboard broadband communication system and said ground station when said emergency response apparatus is activated so that said emergency response apparatus can engage in broadband communication with said emergency response center without being delayed by other users of said onboard broadband communication system while still allowing said other users to use said onboard broadband communication system; and establishing broadband communication between said emergency response apparatus and said emergency response center via said onboard broadband communication system so that said emergency response apparatus can engage in broadband communication with said emergency response center, wherein said step of allocating sold inbound and outbound data streams includes monitoring a size of said inbound and outbound data streams of said emergency response apparatus and said other users and modifying said allocation based upon said size of said monitored inbound and outbound data streams.

27. A broadband emergency response system for use on a mobile platform having an onboard broadband communication system that engages in broadband wireless communication with a ground based station, the broadband emergency response system comprising:

a server onboard said mobile platform that controls the operation of said onboard broadband communication system and allocates inbound and outbound data streams between said onboard broadband communication system and said ground based station so that multiple users onboard said mobile platform can simultaneously use said onboard broadband communication system; and an emergency response apparatus located onboard of said mobile platform, said emergency response apparatus being cable of broadband communication with said onboard broadband communication system via said server and of broadband communication with said ground based station via said onboard broadband communication system, wherein said server allocates inbound and outbound data streams between said onboard broadband communication system and said ground station when said emergency response apparatus requests broadband communication with said emergency response center so that said emergency response apparatus can engage in broadband communication with said emergency response center without being delayed by other users of sad onboard broadband communication system while still allowing said other users to use said onboard broadband communication system to communicate with said ground station, and said server monitors a size of said inbound and outbound data streams of said emergency response apparatus and said other users and modifies said allocation based upon said size of said monitored inbound and outbound data streams.

* * * * *